United States Patent
Vakharwala et al.

(10) Patent No.: US 10,248,574 B2
(45) Date of Patent: Apr. 2, 2019

(54) INPUT/OUTPUT TRANSLATION LOOKASIDE BUFFER PREFETCHING

(71) Applicant: Intel Corporation, Santa Clara, CA (US)

(72) Inventors: Rupin H. Vakharwala, Hillsboro, OR (US); Eric A. Gouldey, Fort Collins, CO (US); Camron B. Rust, Hillsboro, OR (US); Brett Ireland, Hillsboro, OR (US); Rajesh M. Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/608,145

(22) Filed: May 30, 2017

(65) Prior Publication Data

US 2018/0349288 A1     Dec. 6, 2018

(51) Int. Cl.
| | |
|---|---|
| *G06F 12/1081* | (2016.01) |
| *G06F 12/1027* | (2016.01) |
| *G06F 12/0862* | (2016.01) |
| *G06F 11/07* | (2006.01) |
| *G06F 13/16* | (2006.01) |

(52) U.S. Cl.
CPC .......... *G06F 12/1027* (2013.01); *G06F 11/07* (2013.01); *G06F 12/0862* (2013.01); *G06F 13/16* (2013.01); *G06F 2212/305* (2013.01); *G06F 2212/6028* (2013.01)

(58) Field of Classification Search
CPC .............................. G07F 11/07; G06F 12/0862
See application file for complete search history.

(56) References Cited

U.S. PATENT DOCUMENTS

| | | | | |
|---|---|---|---|---|
| 2009/0119663 A1* | 5/2009 | Mukherjee | .......... | G06F 12/1081 718/1 |
| 2014/0281055 A1* | 9/2014 | Davda | ................ | G06F 12/1081 710/26 |
| 2015/0089146 A1* | 3/2015 | Gotwalt | ............. | G06F 12/1009 711/133 |
| 2016/0034406 A1* | 2/2016 | Hansson | ............. | G06F 13/1673 711/105 |

\* cited by examiner

*Primary Examiner* — Ryan Bertram
*Assistant Examiner* — Trang K Ta
(74) *Attorney, Agent, or Firm* — Nicholson De Vos Webster & Elliott LLP (57) ABSTRACT

Embodiments of apparatuses, methods, and systems for input/output translation lookaside buffer (IOTLB) prefetching are described. In an embodiment, an apparatus includes a bridge, an input/output memory management unit (IOMMU), and an IOTLB prefetch unit. The bridge is between an input/output (I/O) side of a system and a memory side of the system. The I/O side is to include an interconnect on which a zero-length transaction is to be initiated by an I/O device. The zero-length transaction is to include an I/O-side memory address. The IOMMU includes address translation hardware and an IOTLB. The address translation hardware is to generate a translation of the I/O-side memory address to a memory-side memory address. The translation is to be stored in the IOTLB. The IOTLB prefetch control unit includes prefetch control logic to cause the apparatus to, in response to determining that the memory-side address is inaccessible, emulate completion of the zero-length transaction.

19 Claims, 8 Drawing Sheets

INPUT/OUTPUT TRANSLATION LOOKASIDE BUFFER PREFETCHING

FIELD OF INVENTION

The field of invention relates generally to computer architecture, and, more specifically, to accessing memory.

BACKGROUND

Computers and other information processing systems may include one or more input/output (I/O) memory management units (each, and IOMMU) to provide memory address translations for I/O and other devices to access a system memory, for example, using direct memory address (DMA) transactions. For example, the IOMMU may receive a DMA transaction, including a memory address, from a device, and translate the memory address from the DMA transaction to a memory address in system memory. To improve performance of the system, the IOMMU may include a cache of recent memory address translations, which may be referred to as an I/O translation lookaside buffer (IOTLB). However, in some cases a device may benefit from a larger translation cache than the IOTLB provides. In this case, the device may include its own cache of recent memory address translations, which may be referred to as a device TLB or an Address Translation Cache (ATC) as described in a Peripheral Component Interconnect Express (PCIe) Address Translation Service (ATS) specification.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or of or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a character between terms may mean that an embodiment may include or be implemented using, with, and/or according to the first term and/or the second term (and/or any other additional terms).

When an IOTLB is used to cache memory address translations, memory access latency and overall system performance may be improved by increasing the frequency of finding memory address translations in the IOTLB. Therefore, embodiments of the invention that may provide for prefetching memory addresses into an IOTLB may be desired. Embodiments of the invention may provide for a device to indicate, prior to accessing a memory address, that a translation for that memory address is to be generated and stored in an IOTLB.

Figure 1:
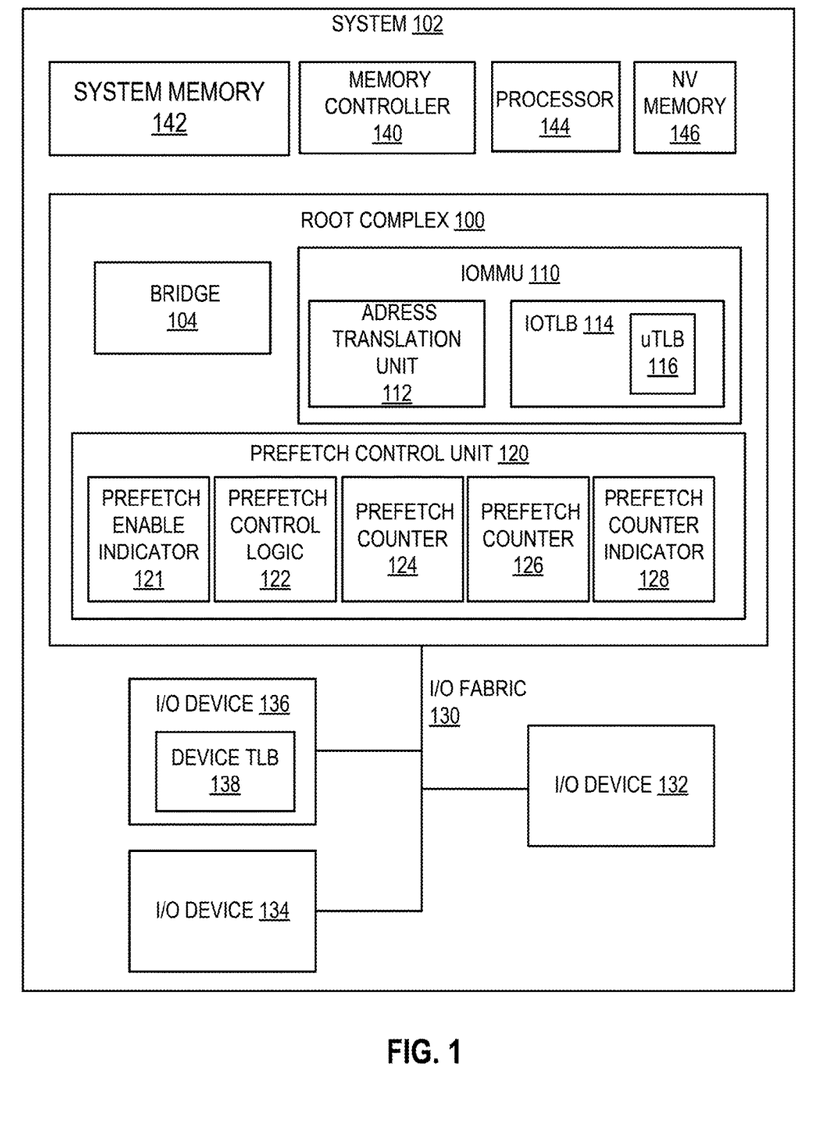
FIG. 1 is a block diagram illustrating a root complex according to an embodiment of the invention.

FIG. 1 is a block diagram illustrating a root complex or other device including or serving as a bridge between one or more I/O devices and system memory according to an embodiment of the invention. Root complex 100 in FIG. 1 may be implemented in logic gates, storage elements, and any other type of circuitry, all or parts of which may be included in a discrete component and/or integrated into the circuitry of a processing device or any other apparatus in a computer or other information processing system. In FIG. 1, root complex 100 is shown within system 102. Also, FIGS. 4 through 8 show processors and systems that may include embodiments of the invention. For example, root complex 100 and/or any or all the elements shown in root complex 100 may be represented by or included in controller hub 520, chipset 690, or DMA unit 832, each as described below.

Root complex 100 may represent any circuitry or component, such as a chipset component, including or through which I/O, peripheral, and/or other components or devices, such as touchscreens, keyboards, microphones, speakers, other audio devices, cameras, video or other media devices, motion or other sensors, receivers for global positioning or other information, network interface controllers, and/or information storage devices, may be connected or coupled to a processor, a memory controller, a system memory, and/or any type of processor/memory subsystem.

System 102 and any other system embodying the invention may include any number of each of these components and any other components or other elements. Any or all of the components or other elements in this or any system embodiment may be connected, coupled, or otherwise in communication with each other through any number of buses, point-to-point, or other wired or wireless interfaces or interconnects, unless specified otherwise. Any components or other portions of system 102, whether shown in FIG. 1 or not shown in FIG. 1, may be integrated or otherwise included on or in a single chip (a system-on-a-chip or SOC), die, substrate, or package.

System memory 142 may be dynamic random access memory (DRAM) or any other type of medium readable by processor 144. System memory 142 may be used to provide a physical memory space from which to abstract a system memory space for system 102. The content of system memory space, at various times during the operation of system 102, may include various combinations of data, instructions, code, programs, software, and/or other information stored in system memory 142 and/or moved from, moved to, copied from, copied to, and/or otherwise stored in various memories, storage devices, and/or other storage locations (e.g., processor caches and registers) in system 102. Memory controller 140 may represent any circuitry or component for accessing, maintaining, and/or otherwise controlling system memory 142.

The system memory space may be logically organized, addressable as, and/or otherwise partitioned (e.g., using any known memory management, virtualization, partitioning, and or other techniques) into regions of one or more sizes. In various embodiments, such regions may be 4K-byte pages, so, for convenience, such regions may be referred to in this description as pages; however, the use of the term "page" in this description may mean any size region of memory.

Processor 144 may represent all or part of a hardware component including one or more processors or processor cores integrated on a single substrate or packaged within a single package, each of which may include multiple execution threads and/or multiple execution cores, in any combination. Each processor represented as or in processor 144 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 144 may be architected and designed to operate according to any instruction set architecture (ISA).

Nonvolatile memory 146 may be any type of nonvolatile memory and may be used to store any code, data, or information to be maintained during various power states and through various power cycles of system 102. For example, nonvolatile memory 146 may be used to store basic input/output system (BIOS) or other code that may be used for booting, restarting, and/or resetting system 102 or any portion of system 102.

Root complex 100 includes bridge 104, which may include any circuitry, other hardware, or firmware to connect a memory side (e.g., a subsystem including system memory 142) of system 102 to an I/O side (e.g., a subsystem including I/O devices 132, 134, and 136) of system 102, and/or to deliver, forward, translate, associate, and/or otherwise bridge transactions or other communications between the memory side and the I/O side.

Root complex 100 also includes IOMMU 110 and prefetch control unit 120, and is connected to I/O devices 132, 134, and 136 through I/O fabric 130. Root complex 100 may also be connected, directly or indirectly, to memory controller 140, system memory 142, processor 144, and/or nonvolatile memory 146, any or all of which may be integrated onto the same silicon chip or other substrate as root complex 100.

IOMMU 110 includes address translation unit 112, which may represent or include any address translation circuit or logic to translate addresses that may be used by I/O or other peripheral devices to request an access to system memory 142 to addresses that may be used to access system memory 142 (IOMMU DMA remapping). For convenience, the first type of address may be referred to as an I/O-side memory address, and may include addresses used by I/O devices in DMA transactions, addresses used by I/O devices in virtual environments, and/or any other addresses used by I/O or other peripheral devices or within address spaces as seen by I/O or other peripheral devices. The second type of address may be referred to as a memory-side memory address, and may include addresses used by memory controller 140 to access system memory 142, such as a host physical address, and/or any other address within an address space on the system memory side of root complex 100. Address translation unit 112 may use any number of page tables, extended page tables, nested page tables, or other non-hierarchical or hierarchical data structures stored in system memory 142 or elsewhere to perform any number of page walks, lookups, or other translation techniques.

IOMMU 110 also includes IOTLB 114 to store translations generated by address translation unit 112 or otherwise useful for finding memory-side memory addresses corresponding to I/O-side memory addresses and/or vice versa. IOTLB 114 may include or be partitioned into separate portions (each, a micro-TLB or uTLB), each of which may be dedicated to an I/O device. For example, IOTLB 114 is shown as including uTLB 116 dedicated to I/O device 132. Translations may also or instead be stored in a device TLB, such as device TLB 138 in I/O device 136.

Prefetch control unit 120 in root complex 100 includes prefetch enable indicator 121, prefetch control logic 122, prefetch counter 124, prefetch counter 126, and prefetch counter indicator 128. Prefetch enable indicator 121 may represent a single-bit storage location (e.g., in a capability register) that is programmable by software or configurable by firmware or hardware to enable prefetching according to an embodiment of the invention. Prefetch enable indicator 121 may be clear by default to provide for root complex 100 and/or system 102 to automatically operate according to any previously known or other approach. Various other embodiments are possible within the scope of the invention; for example, prefetch enable indicator 121 may represent a two-bit storage location with a first bit for zero-length reads (ZLRs, described below) and a second bit for zero-length writes (ZLWs, described below). As may be true for any elements shown in the figures, the location of prefetch enable indicator 121 does not necessarily indicate its physical location within the system; for example, it may be physically within a register that is not within prefetch control unit 120.

Prefetch control logic 122 may include a state machine or any other type of control circuitry, logic, hardware, or firmware to control the operation of prefetch control unit 120 and/or root complex 100 and/or communications with IOTLB 110 and/or root complex 100 to implement embodiments of the invention, for example, while prefetch enable indicator 121 is set. Prefetch control unit 120 may be initialized or reset (e.g., setting or clearing of prefetch enable indicator 121, reset of a state machine in prefetch control logic 122) through the execution of code from nonvolatile memory 146 by processor 144 or through any other approach. In addition to or instead of using prefetch control logic 122 to implement embodiments of the invention, embodiments may include implementations in other circuitry and/or firmware in root complex 120, such as in the firmware that controls the operation of root complex 120 in response to certain bus or interconnect transactions, as further described below.

Prefetch counter 124 and prefetch counter 126 may each represent any type of counter implemented in circuitry or other hardware to keep track of the number of pending requests that have been sent to IOMMU 110 as a result of a prefetch request or a bus or interconnect transaction that may be used, in addition to other uses, to indicate a prefetch request according to embodiments of the invention. Prefetch counter indicator 128 may represent a single-bit storage location configurable and/or accessible by prefetch control logic 122 to be used to indicate and/or determine which one of prefetch counter 124 and prefetch counter 126 is to be used. Use of prefetch counter 124, prefetch counter 126, and prefetch counter indicator 128 is described below.

I/O fabric 130 may represent any bus, interconnect, or fabric, such as a PCIe interconnect, through which I/O and/or peripheral devices, such as I/O devices 132, 134, and 136 may be coupled or connected to root complex 100. I/O devices 132, 134, and/or 136 may be devices that may be able to perform the role of a requester and/or a completer of a PCIe transaction, where a "requester" may refer to a device that is able to originate a transaction on a I/O fabric 130, a "completer" may refer to a device that is addressed and/or targeted by a requester, and a "transaction" may refer to any transaction, command, message, or communication on or through I/O fabric 130.

Transactions on I/O fabric 130 may include DMA and/or other transactions I/O devices may access and/or request or attempt to access system memory 144. These memory access transactions may include read transactions and write transactions, including reads without data (zero-length reads or ZLRs) and writes without data (zero-length writes or ZLWs). ZLRs and ZLWs may include read and write transactions in which an address is specified but all the data is or is to be ignored, absent, disregarded, or considered invalid; in other words, no data is to be read or written. For example, all the byte-enable bits that specify which bytes of a data field are to be read or written may be zeroes to indicate that none of the bytes of the data field are to be read or written.

Root complex 100 may respond to a ZLR and/or ZLW transaction in at least two different ways. In an embodiment, prefetch control logic 122 may cause root complex 100 to respond a first way if or while a first value (e.g., logical zero) is stored in prefetch enable indicator 121 and a second way if or while a second value (e.g., logical one) is stored in prefetch enable indicator 121.

The first way may be according to a previously known or standard approach, which may include determining whether the target page (i.e., the page including the address specified in the ZLR/ZLW transaction) is present, readable, and/or writable, or whether the corresponding memory-side address is otherwise inaccessible. For example, a logical zero value of corresponding read-permission bit in an access control or address translation data structure may indicate that the page is not readable, and a logical zero value of a corresponding write-permission bit in an access control or address translation data structure may indicate that the page is not writable. Based on this determination, the ZLR/ZLW transaction may be completed or may generate a page fault or other fault. For example, if in response to a ZLR, it is determined that the target page is not readable and not writable, and, in response to a ZLW, it is determined that the target page is not writable, root complex 100 may generate a page fault and not initiate a corresponding memory-side transaction to system memory 142. Otherwise, the transaction may be completed, including using the I/O-side address provided by the I/O device to find a corresponding memory-side address in IOTLB 114 or through a page-walk, in which case the translation may be stored in IOTLB 114, and initiating a corresponding memory-side transaction to system memory 142.

The second way may be according to a novel approach that provides for I/O devices to use ZLR/ZLW transactions for prefetching to IOTLB 114 or any other purpose, without the potential to cause a fault, even when the target page is not present, readable, or writable. Allowing I/O devices to use ZLR/ZLW transactions without causing a fault may be desirable to improve performance because the fault could cause a virtual machine exit, context switch, and/or a device or function reset, any of which would consume many clock cycles.

This novel approach may include determining whether the target page (i.e., the page including the address specified in the ZLR/ZLW transaction) is present, readable, and/or writable, or whether the corresponding memory-side address is otherwise inaccessible. For example, a logical zero value of corresponding read-permission bit in an access control or address translation data structure may indicate that the page is not readable, and a logical zero value of a corresponding write-permission bit in an access control or address translation data structure may indicate that the page is not writable. Based on this determination, the ZLR/ZLW transaction may be completed or emulated. For example, if it is determined that the page is either readable or writeable, the ZLR/ZLW transaction may be completed, including using the I/O-side address provided by the I/O device to find a corresponding memory-side address in IOTLB 114 or through a page-walk, in which case the translation may be stored in IOTLB 114, and initiating a corresponding memory-side transaction to system memory 142. However, the page is neither readable nor writeable, root complex 114 would emulate successful completion of the ZLR/ZLW without generating or reporting a fault, and abort the generation (for example, through a page-walk) of a corresponding translation to be stored in IOTLB 114.

In various embodiments of the invention, root complex 100 may emulate successful completion of a ZLR/ZLW transaction according to any one or more of various approaches. In an embodiment, root complex 100 may emulate completion of a ZLR/ZLW by completing the I/O-side transaction without initiating a corresponding memory-side transaction to system memory 142, and, in the case of a ZLR, returning a predetermined (e.g., determined before receiving the ZLR/ZLW transaction) value (e.g., all zeroes) to the requestor. In an embodiment, root complex 100 may initiate a memory-side transaction to system memory 142 using a predetermined (e.g., determined before receiving the ZLR/ZLW transaction) memory-side memory address that is considered safe (e.g., will not cause negative effects), which, since it is a zero-length transaction.

Furthermore, in response to a ZLR/ZLW, root complex 100 may initiate a translation by IOMMU 110 but emulate completion of the ZLR/ZLW before receiving the result of the translation. In an embodiment, root complex 100 may mark ZLR/ZLW transactions as special transactions that may be completed without waiting for IOMMU 110 to complete the translation, provide for correct ordering of transactions on I/O fabric 130 (e.g., in compliance with the PCIe specification) even when a ZLR/ZLW transaction is completed before the corresponding translation is received, and ignore the completed translation upon receipt.

In an embodiment, root complex 100 may provide for draining transactions upon request by IOMMU 110. For this purpose, one or more counters may be used to track the number of pending translations corresponding to ZLR/ZLW transactions. For example, root complex 100 may increment a counter in connection with requesting a translation corresponding to a ZLR/ZLW transactions and decrement the counter in response to receiving the completed translation. Completion of a drain may involve waiting until the counter indicates that no such translations are pending (e.g., the counter value is zero). To avoid a deadlock condition that might occur if root complex 100 were to continue requesting such translations during a drain, prefetch control logic 122 may use prefetch counter indicator 128 to specify which one of prefetch counters 124 and 126 is in use (e.g., being incremented in response to a translation request), then, in response to a drain request, switch to the other of the two counters for new translation requests. Therefore, a first counter may be used for keeping track of translation requests that were pending before the drain was requested and a second counter may be used for keeping track of translation requests that are pending after the drain was requested.

Figure 2:
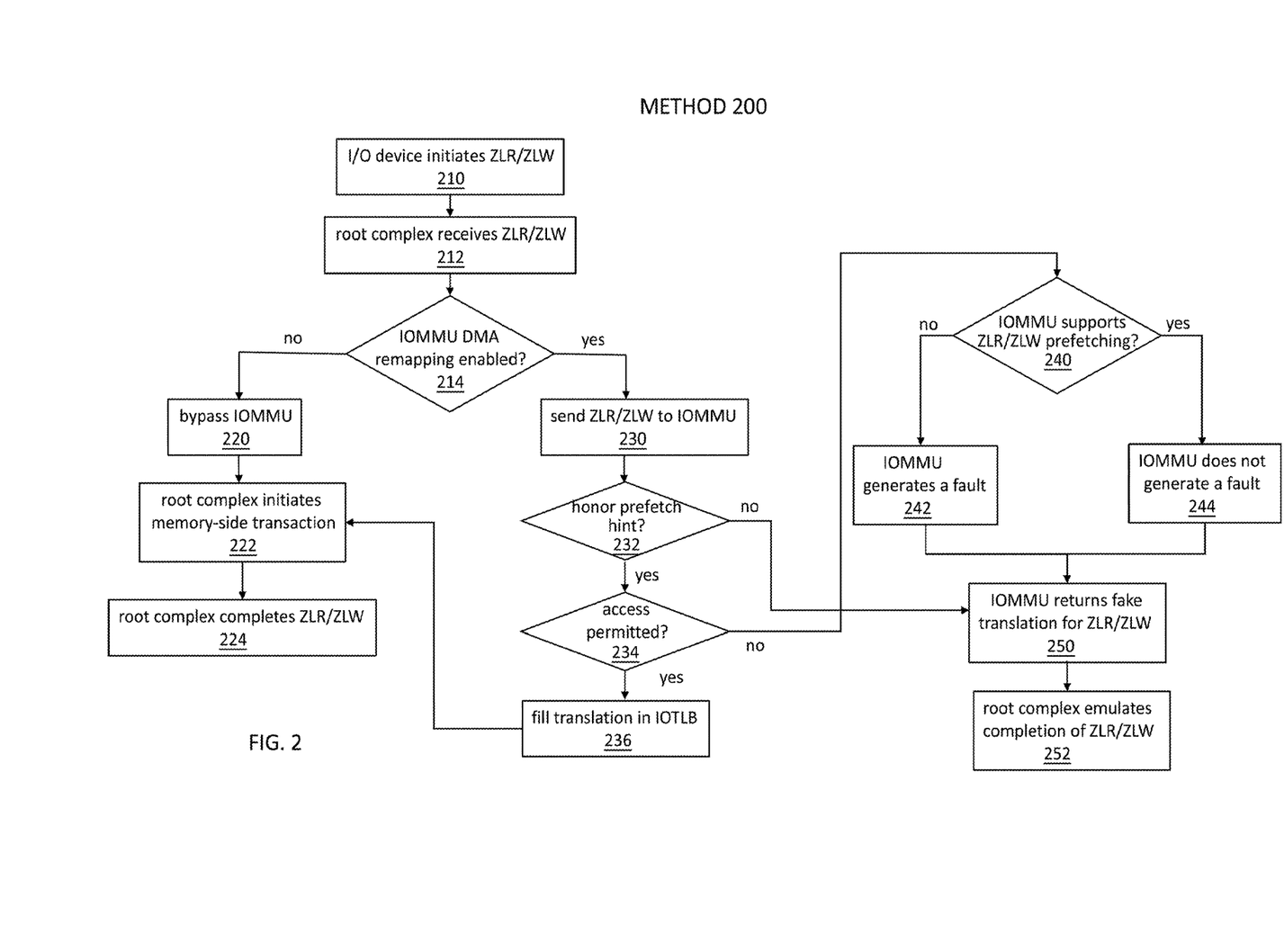
FIG. 2 is a flow diagram illustrating a method for IOTLB prefetching according to an embodiment of the invention.

FIG. 2 is a flow diagram illustrating a method for IOTLB prefetching according to an embodiment of the invention. In block 210 of method 200, a ZLR/ZLW transaction is initiated on an I/O fabric by an I/O device. In block 212, the ZLR/ZLW transaction is received by a root complex. In block 214, the root complex determines whether IOMMU DMA remapping is enabled. If IOMMU DMA remapping is not enabled, then method 200 continues in block 220. If IOMMU DMA remapping is enabled, then method 200 continues in block 230.

In block 220, since IOMMU DMA remapping is not enabled, operation of the root complex in response to the ZLR/ZLW transaction bypasses the IOMMU. In block 222, the root complex initiates a memory-side transaction corresponding to the ZLR/ZLW transaction on the I/O side. In block 224, the root complex completes the ZLR/ZLW transaction on the I/O side.

In block 230, since IOMMU DMA remapping is enabled, the root complex sends the ZLR/ZLW transaction to the IOMMU. In block 232, the IOMMU determines whether it is configured to honor prefetch hints according to an embodiment of the invention. When ZLR/ZLW transactions are being treated as prefetch hints from I/O devices, the IOMMU may be configured to not honor them and, instead, return a fake response to the root complex, since the root complex is configured to ignore IOMMU responses to ZLR/ZLW transactions. Thus, embodiments of the invention provide for system software to configure the IOMMU to ignore prefetch hints from some I/O devices and honor them from other I/O devices. In some embodiments, the IOMMU may ignore ZLR/ZLW-based prefetch hints in other scenarios, such as when the IOTLB and/or translation unit is full and/or other resource constraints exist. The ZLR/ZLW-based prefetch hint configuration of the IOMMU may be exposed to the root complex, and, when it is configured to ignore a prefetch hint, the root-complex may be able to decide, based on its own heuristic, if the ZLR/ZLW transaction is to be completed without sending it to the IOMMU.

If, in block 232, it is determined that the IOMMU is honoring the prefetch hint, then method 200 continues in block 234. If, in block 232, it is determined that the IOMMU is not honoring the prefetch hint, then method 200 continues in block 240.

In block 234, the root complex determines whether the I/O device is permitted to access the system memory according to the type of request (e.g., read or write) and the target location (e.g., page). If not, then method 200 continues in block 240. If so, then method 200 continues in block 236 with the IOMMU performing the address translation and filling the IOTLB with it, and then method 200 continues in block 222.

In block 240, it is determined whether the IOMMU supports ZLR/ZLW prefetching according to an embodiment of the invention. If not, then method 200 continues block 242 with the IOMMU generating a fault, and then method 200 continues in block 250. If so, then method 200 continues in block 244 without the IOMMU generating a fault, and then method 200 continues in block 250.

In block 250, the IOMMU returns a fake translation for the ZLR/ZLW transaction. In block 252, the root complex emulates completion of the ZLR/ZLW transaction on the I/O side.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU;

3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 3A:
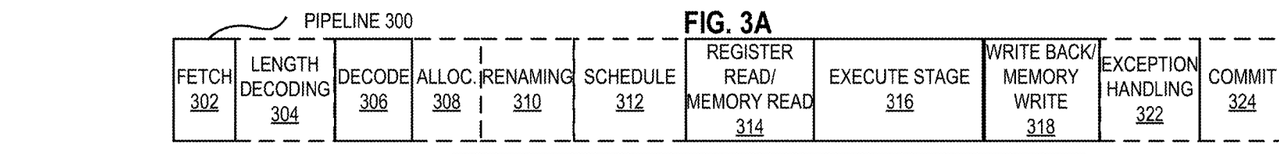
FIG. 3A is a block diagram illustrating both an exemplary in-order pipeline and an exemplary register renaming, out-of-order issue/execution pipeline according to embodiments of the invention.
Figure 3B:
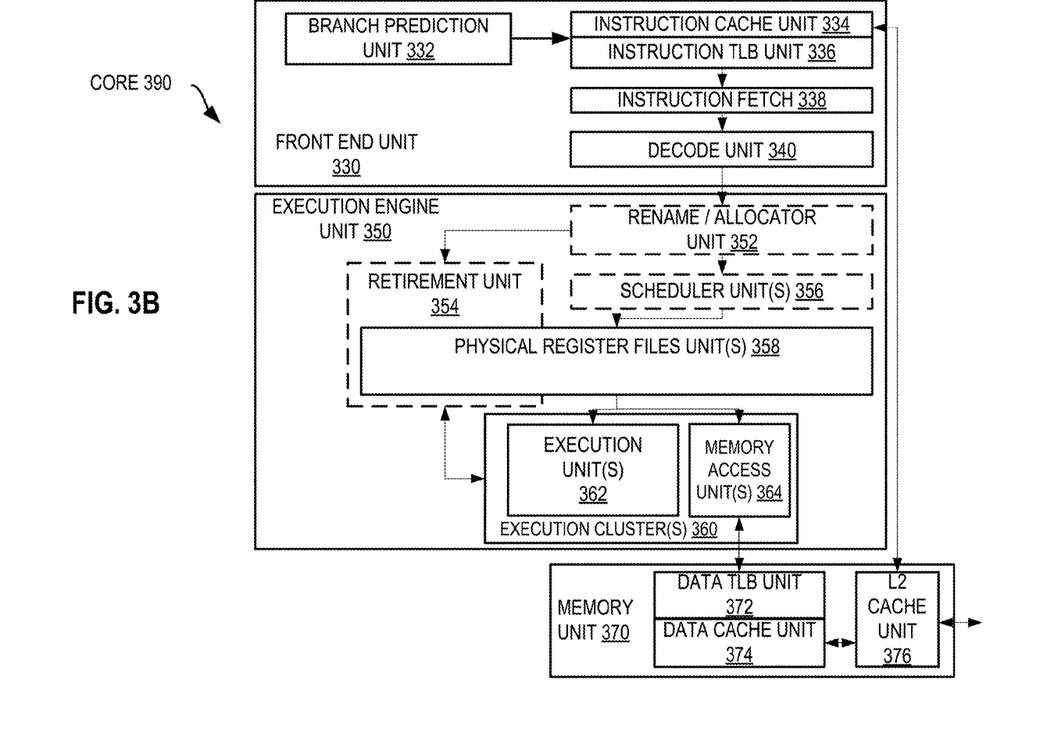
FIG. 3B is a block diagram illustrating both an exemplary embodiment of an in-order architecture core and an exemplary register renaming, out-of-order issue/execution architecture core to be included in a processor according to embodiments of the invention.

FIG. 3A is a block diagram illustrating both an exemplary in-order pipeline and an exemplary register renaming, out-of-order issue/execution pipeline according to embodiments of the invention. FIG. 3B is a block diagram illustrating both an exemplary embodiment of an in-order architecture core and an exemplary register renaming, out-of-order issue/execution architecture core to be included in a processor according to embodiments of the invention. The solid lined boxes in FIGS. 3A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3A, a processor pipeline 300 includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324.

FIG. 3B shows processor core 390 including a front end unit 330 coupled to an execution engine unit 350, and both are coupled to a memory unit 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit 330 includes a branch prediction unit 332, which is coupled to an instruction cache unit 334, which is coupled to an instruction translation lookaside buffer (TLB) 336, which is coupled to an instruction fetch unit 338, which is coupled to a decode unit 340. The decode unit 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM or other medium that stores microcode for certain macroinstructions (e.g., in decode unit 340 or otherwise within the front end unit 330). The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations, central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 358 comprises a vector registers unit, a write mask registers unit, and a scalar registers unit. These register units may provide architectural vector registers, vector mask registers, and general purpose registers. The physical register file(s) unit(s) 358 is overlapped by the retirement unit 354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which includes a data TLB unit 372 coupled to a data cache unit 374 coupled to a level 2 (L2) cache unit 376. In one exemplary embodiment, the memory access units 364 may include a load unit, a store address unit, and a store data unit, each of which is coupled to the data TLB unit 372 in the memory unit 370. The instruction cache unit 334 is further coupled to a level 2 (L2) cache unit 376 in the memory unit 370. The L2 cache unit 376 is coupled to one or more other levels of cache and eventually to a main memory.

By way of example, the exemplary register renaming, out-of-order issue/execution core architecture may implement the pipeline 300 as follows: 1) the instruction fetch 338 performs the fetch and length decoding stages 302 and 304; 2) the decode unit 340 performs the decode stage 306; 3) the rename/allocator unit 352 performs the allocation stage 308 and renaming stage 310; 4) the scheduler unit(s) 356 performs the schedule stage 312; 5) the physical register file(s) unit(s) 358 and the memory unit 370 perform the register read/memory read stage 314; the execution cluster 360 perform the execute stage 316; 6) the memory unit 370 and the physical register file(s) unit(s) 358 perform the write back/memory write stage 318; 7) various units may be involved in the exception handling stage 322; and 8) the retirement unit 354 and the physical register file(s) unit(s) 358 perform the commit stage 324.

The core 390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 390 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 334/374 and a shared L2 cache unit 376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
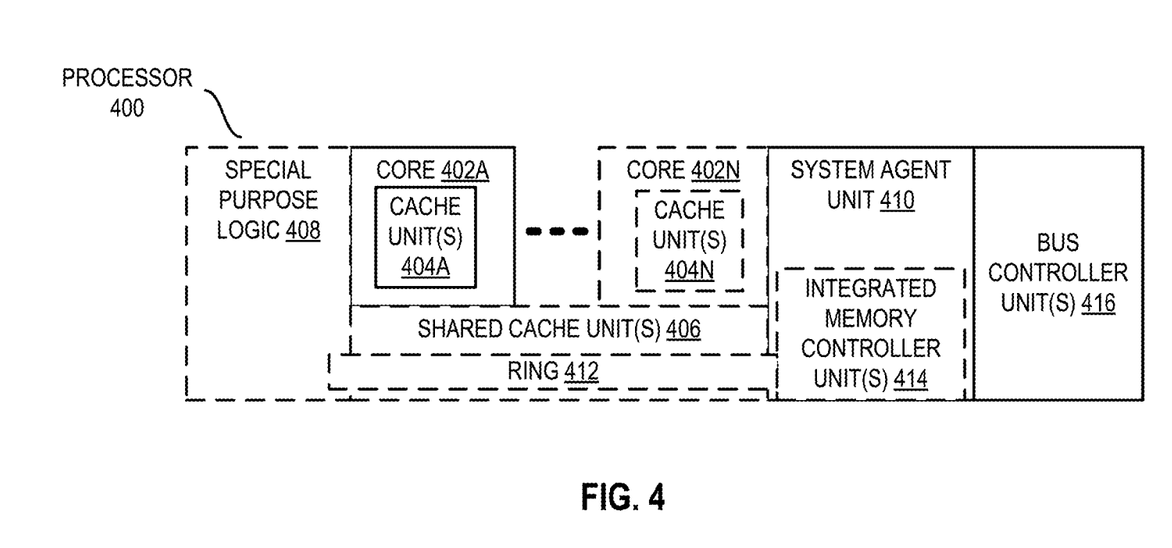
FIG. 4 is a block diagram of a processor that may have more than one core, may have an integrated memory controller, and may have integrated graphics according to embodiments of the invention.

FIG. 4 is a block diagram of a processor 400 that may have more than one core, may have an integrated memory controller, and may have integrated graphics according to embodiments of the invention. The solid lined boxes in FIG. 4 illustrate a processor 400 with a single core 402A, a system agent 410, a set of one or more bus controller units 416, while the optional addition of the dashed lined boxes illustrates an alternative processor 400 with multiple cores 402A-N, a set of one or more integrated memory controller unit(s) 414 in the system agent unit 410, and special purpose logic 408.

Thus, different implementations of the processor 400 may include: 1) a CPU with the special purpose logic 408 being integrated graphics and/or scientific (throughput) logic (which may include one or more cores), and the cores 402A-N being one or more general purpose cores (e.g., general purpose in-order cores, general purpose out-of-order cores, a combination of the two); 2) a coprocessor with the cores 402A-N being a large number of special purpose cores intended primarily for graphics and/or scientific (throughput); and 3) a coprocessor with the cores 402A-N being a large number of general purpose in-order cores. Thus, the processor 400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 406, and external memory (not shown) coupled to the set of integrated memory controller units 414. The set of shared cache units 406 may include one or more mid-level caches, such as level 2 (L2), level 3 (L3), level 4 (L4), or other levels of cache, a last level cache (LLC), and/or combinations thereof. While in one embodiment a ring based interconnect unit 412 interconnects the integrated graphics logic 408 (integrated graphics logic 408 is an example of and is also referred to herein as special purpose logic), the set of shared cache units 406, and the system agent unit 410/integrated memory controller unit(s) 414, alternative embodiments may use any number of well-known techniques for interconnecting such units. In one embodiment, coherency is maintained between one or more cache units 406 and cores 402-A-N.

In some embodiments, one or more of the cores 402A-N are capable of multi-threading. The system agent 410 includes those components coordinating and operating cores 402A-N. The system agent unit 410 may include for example a power control unit (PCU) and a display unit. The PCU may be or include logic and components needed for regulating the power state of the cores 402A-N and the integrated graphics logic 408. The display unit is for driving one or more externally connected displays.

The cores 402A-N may be homogenous or heterogeneous in terms of architecture instruction set; that is, two or more of the cores 402A-N may be capable of execution the same instruction set, while others may be capable of executing only a subset of that instruction set or a different instruction set.

Exemplary Computer Architectures

FIGS. 5-8 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 5:
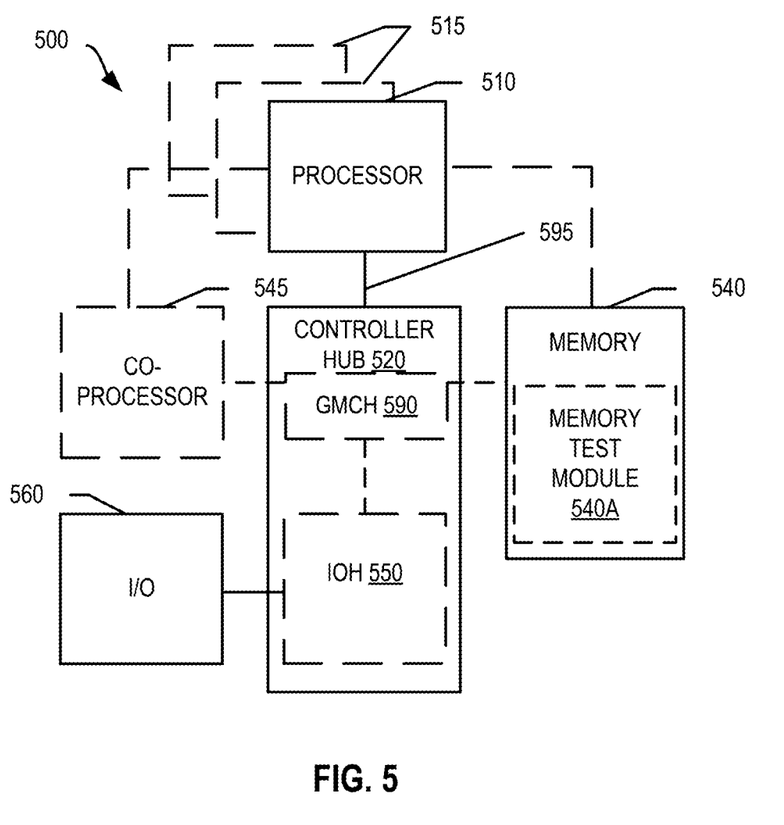
FIG. 5 is a block diagram of a system in accordance with one embodiment of the present invention.

Referring now to FIG. 5, shown is a block diagram of a system 500 in accordance with one embodiment of the present invention. The system 500 may include one or more processors 510, 515, which are coupled to a controller hub 520. In one embodiment, the controller hub 520 includes a graphics memory controller hub (GMCH) 590 and an Input/Output Hub (IOH) 550 (which may be on separate chips); the GMCH 590 includes memory and graphics controllers to which are coupled memory 540 and a coprocessor 545; the IOH 550 couples input/output (I/O) devices 560 to the GMCH 590. Alternatively, one or both of the memory and graphics controllers are integrated within the processor (as described herein), the memory 540 and the coprocessor 545 are coupled directly to the processor 510, and the controller hub 520 in a single chip with the IOH 550.

The optional nature of additional processors 515 is denoted in FIG. 5 with broken lines. Each processor 510, 515 may include one or more of the processing cores described herein and may be some version of the processor 400.

The memory 540 may be, for example, dynamic random access memory (DRAM), phase change memory (PCM), or a combination of the two. For at least one embodiment, the controller hub 520 communicates with the processor(s) 510, 515 via a multi-drop bus, such as a frontside bus (FSB), point-to-point interface such as QuickPath Interconnect (QPI), or similar connection 595.

In one embodiment, the coprocessor 545 is a special-purpose processor, such as, for example, a high-throughput MIC processor, a network or communication processor, compression engine, graphics processor, GPGPU, embedded processor, or the like. In one embodiment, controller hub 520 may include an integrated graphics accelerator.

There can be a variety of differences between the physical resources 510, 515 in terms of a spectrum of metrics of merit including architectural, microarchitectural, thermal, power consumption characteristics, and the like.

In one embodiment, the processor 510 executes instructions that control data processing operations of a general type. Embedded within the instructions may be coprocessor instructions. The processor 510 recognizes these coprocessor instructions as being of a type that should be executed by the attached coprocessor 545. Accordingly, the processor 510 issues these coprocessor instructions (or control signals representing coprocessor instructions) on a coprocessor bus or other interconnect, to coprocessor 545. Coprocessor(s) 545 accept and execute the received coprocessor instructions.

Figure 6:
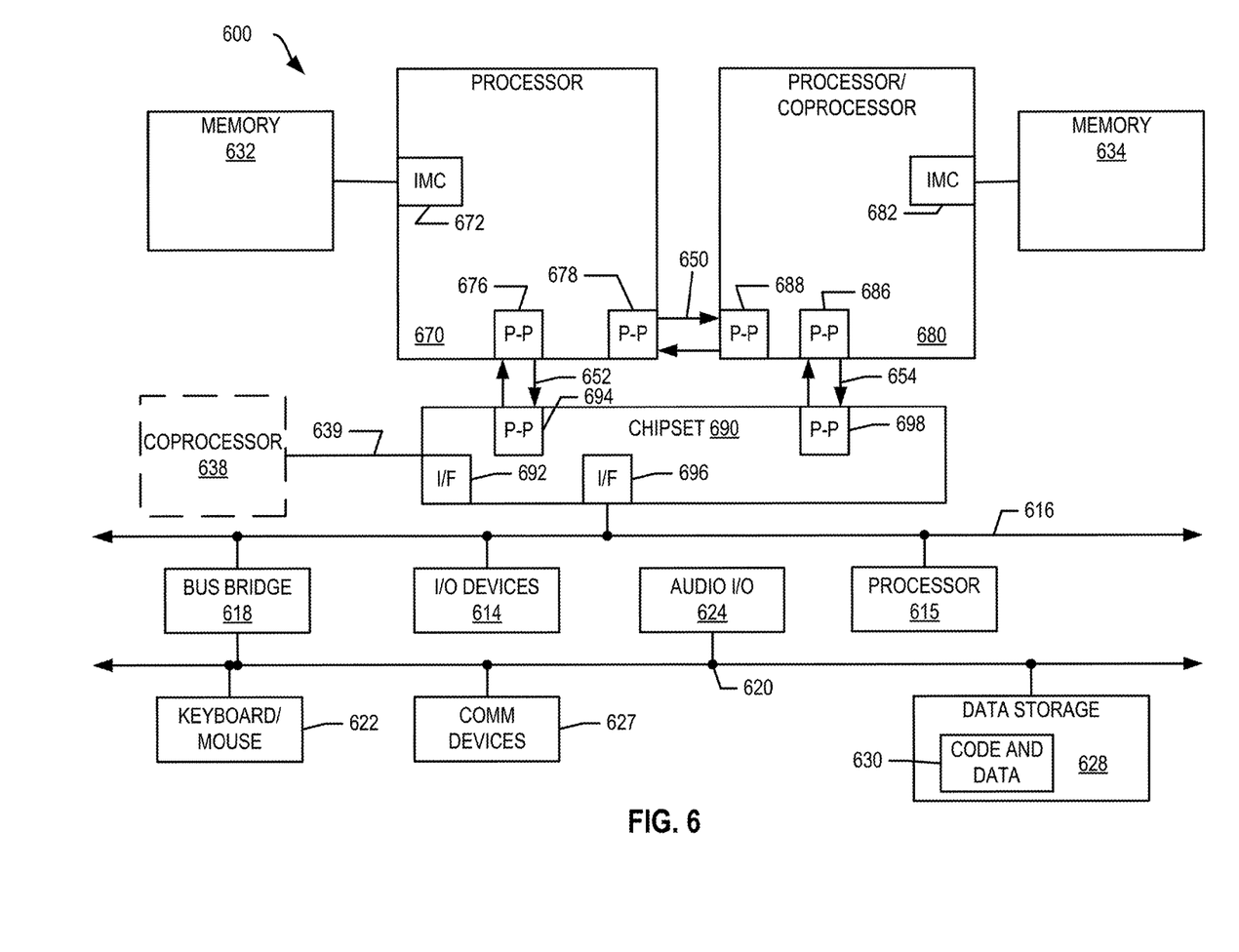
FIG. 6 is a block diagram of a first more specific exemplary system in accordance with an embodiment of the present invention.

Referring now to FIG. 6, shown is a block diagram of a first more specific exemplary system 600 in accordance with an embodiment of the present invention. As shown in FIG. 6, multiprocessor system 600 is a point-to-point interconnect system, and includes a first processor 670 and a second processor 680 coupled via a point-to-point interconnect 650. Each of processors 670 and 680 may be some version of the processor 400. In one embodiment of the invention, processors 670 and 680 are respectively processors 510 and 515, while coprocessor 638 is coprocessor 545. In another embodiment, processors 670 and 680 are respectively processor 510 coprocessor 545.

Processors 670 and 680 are shown including integrated memory controller (IMC) units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may optionally exchange information with the coprocessor 638 via a high-performance interface 692. In one embodiment, the coprocessor 638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 may be coupled to first bus 616, along with a bus bridge 618 which couples first bus 616 to a second bus 620. In one embodiment, one or more additional processor(s) 615, such as coprocessors, high-throughput MIC processors, GPGPU's, accelerators (such as, e.g., graphics accelerators or digital signal processing (DSP) units), field programmable gate arrays, or any other processor, are coupled to first bus 616. In one embodiment, second bus 620 may be a low pin count (LPC) bus. Various devices may be coupled to a second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to the second bus 620. Note that other architectures are possible. For example, instead of the point-to-point architecture of FIG. 6, a system may implement a multi-drop bus or other such architecture.

Figure 7:
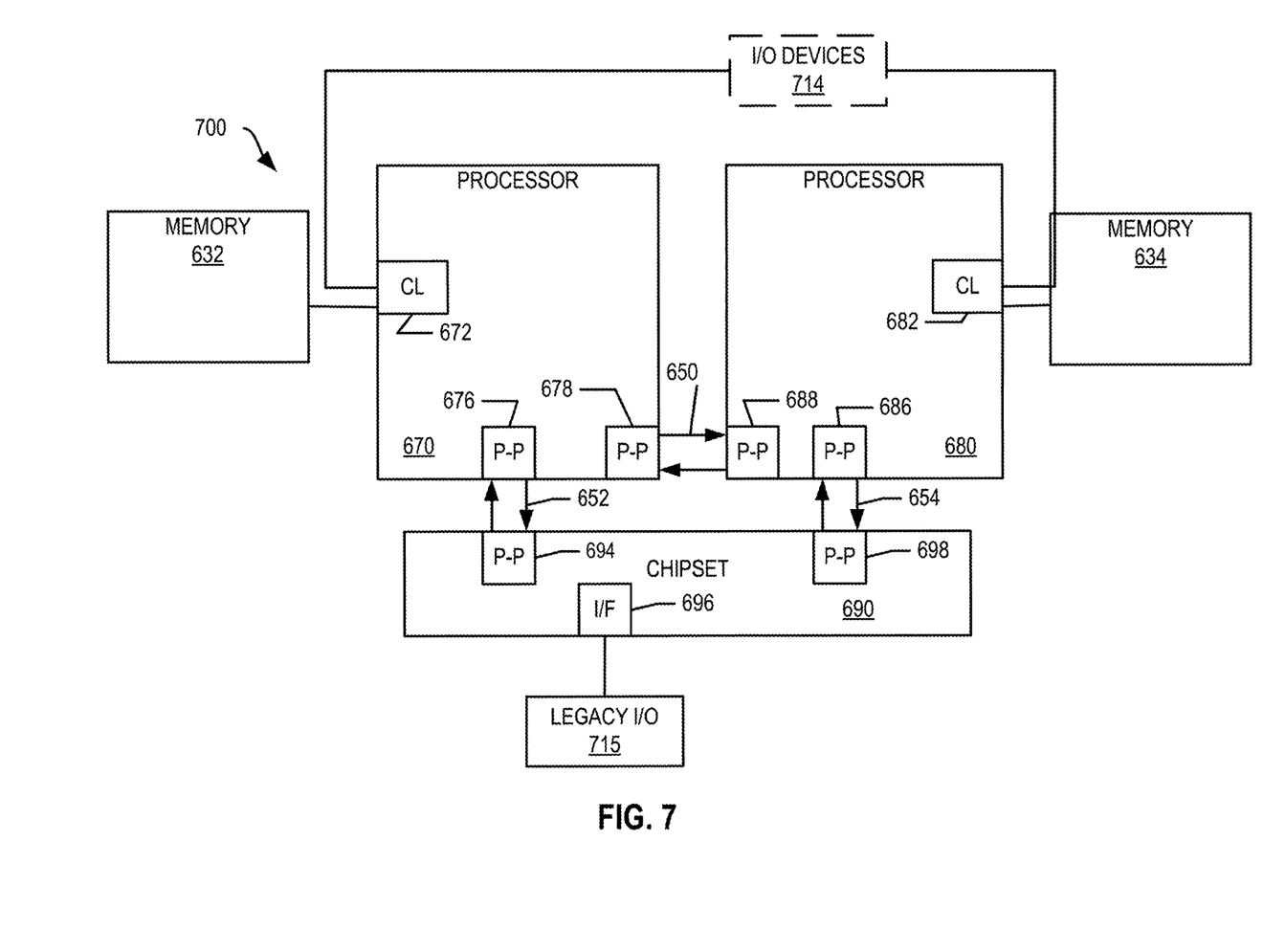
FIG. 7 is a block diagram of a second more specific exemplary system in accordance with an embodiment of the present invention.

Referring now to FIG. 7, shown is a block diagram of a second more specific exemplary system 700 in accordance with an embodiment of the present invention. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processors 670, 680 may include integrated memory and I/O control logic ("CL") 672 and 682, respectively. Thus, the CL 672, 682 include integrated memory controller units and include I/O control logic. FIG. 7 illustrates that not only are the memories 632, 634 coupled to the CL 672, 682, but also that I/O devices 714 are also coupled to the control logic 672, 682. Legacy I/O devices 715 are coupled to the chipset 690.

Figure 8:
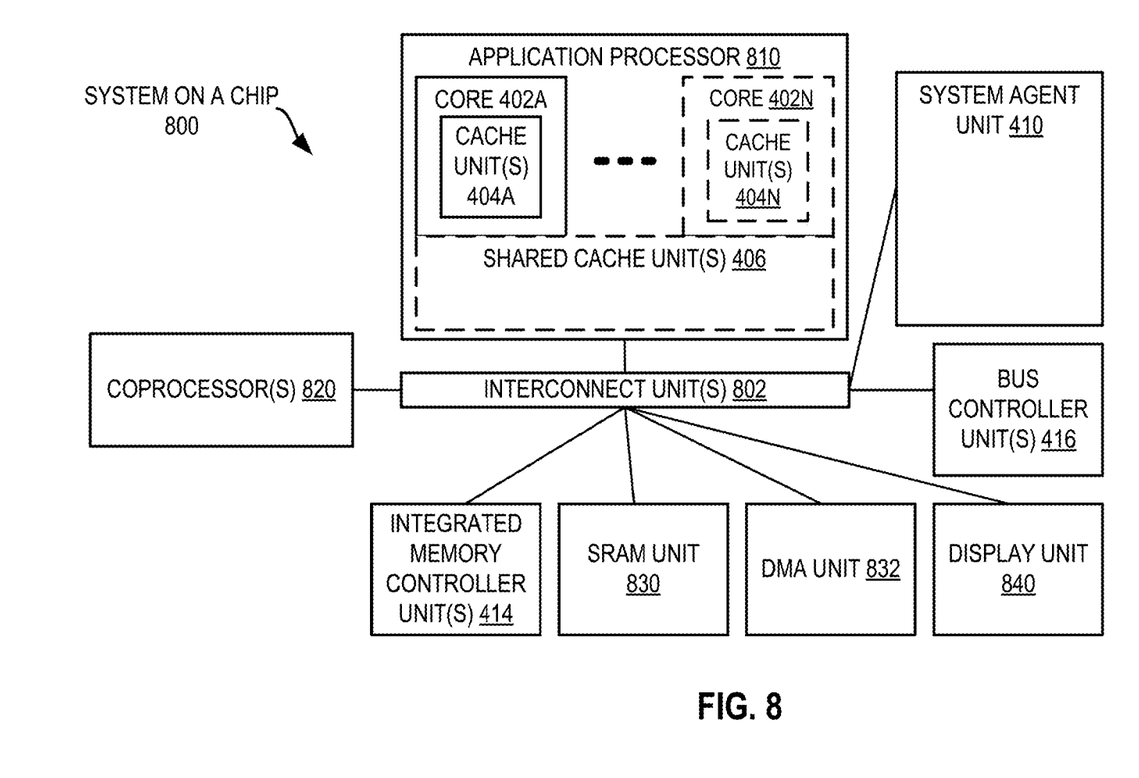
FIG. 8 is a block diagram of a SoC in accordance with an embodiment of the present invention.

Referring now to FIG. 8, shown is a block diagram of a SoC 800 in accordance with an embodiment of the present invention. Similar elements in FIG. 4 bear like reference numerals. Also, dashed lined boxes are optional features on more advanced SoCs. In FIG. 8, an interconnect unit(s) 802 is coupled to: an application processor 810 which includes a set of one or more cores 402A-N, which include cache units 404A-N, and shared cache unit(s) 406; a system agent unit 410; a bus controller unit(s) 416; an integrated memory controller unit(s) 414; a set or one or more coprocessors 820 which may include integrated graphics logic, an image processor, an audio processor, and a video processor; an static random access memory (SRAM) unit 830; a direct memory access (DMA) unit 832; and a display unit 840 for coupling to one or more external displays. In one embodiment, the coprocessor(s) 820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 630 illustrated in FIG. 6, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, an apparatus may include a bridge, an IOMMU, and an IOTLB prefetch unit. The bridge is between an input/output (I/O) side of a system and a memory side of the system. The I/O side is to include an interconnect on which a zero-length transaction is to be initiated by an I/O device. The zero-length transaction is to include an I/O-side memory address. The IOMMU includes address translation hardware and an IOTLB. The address translation hardware is to generate a translation of the I/O-side memory address to a memory-side memory address. The translation is to be stored in the IOTLB. The IOTLB prefetch control unit includes prefetch control logic to cause the apparatus to, in response to determining that the memory-side address is inaccessible, emulate completion of the zero-length transaction. The prefetch control logic may include a state machine. The prefetch control logic may also be to determine, based on a prefetch enable indicator, whether to generate a fault instead of cause the apparatus to emulate completion of the zero-length transaction. The apparatus may also include a first counter to keep track of pending translation requests from the IOTLB prefetch control unit to the IOMMU. The apparatus may also include a second counter to keep track of pending translation requests from the IOTLB prefetch control unit to the IOMMU and a prefetch counter indicator to track which of the first counter and the second counter the IOTLB prefetch control unit is to increment in connection with a new translation request.

In an embodiment, a method may include initiating, by an input/output (I/O) device on an I/O side of a system, a zero-length transaction; receiving, by a root complex on the I/O fabric, the zero-length transaction; determining, by the root complex based on a request type and a target location, whether the I/O device is permitted to access a system memory, the request type and the target location indicated by the zero-length transaction; and emulating, by the root complex in response to determining that the I/O device is not permitted to access the system memory, completion of the zero-length transaction instead of generating a fault. The method may also include, by the root complex in response to determining that the I/O device is permitted to access the system memory, initiating a memory-side transaction corresponding to the zero-length transaction. The method may also include, by an I/O translation lookaside buffer (IOTLB) prefetch unit, requesting a translation of an I/O-side memory address to a memory-side memory address. The method may also include, by the IOTLB prefetch unit in connection with requesting the translation, incrementing a first counter. The method may also include, by an I/O memory management unit (IOMMU), translating the I/O-side memory address to the memory-side address to generate a completed translation. The method may also include, by the IOMMU, storing the completed translation in the IOTLB. The method of may also include, by the IOMMU to the IOTLB prefetch unit, indicating that the translation is complete. The method may also include, by the IOTLB prefetch unit in response to an indication that the translation is complete, decrementing the first counter. The method may also include, by the IOMMU, requesting the IOTLB prefetch unit to drain transactions. The method may also include, by the IOTLB prefetch unit in response to receiving a request from the IOMMU to drain transactions, switching to incrementing a second counter instead of the first counter in connection with requesting a new translation. The method may also include determining, by the root complex, whether I/O device prefetching to an input/output translation lookaside buffer (IOTLB) is enabled; and generating, by the root complex in response to determining that I/O device prefetching to the IOTLB is not enabled and that the I/O device is not permitted to access the system memory, a fault instead of emulating completion of the zero-length transaction.

In an embodiment, an apparatus may include means for performing any of the methods described above. In an embodiment, a machine-readable tangible medium may store instructions, which, when executed by a machine, cause the machine to perform any of the methods described above.

In an embodiment, a system may include a memory side including a system memory; an input/output (I/O) side including an I/O device and an interconnect on which a zero-length transaction is to be initiated by the I/O device, the zero-length transaction to include an I/O-side memory address; an input/output memory management unit (IOMMU) including address translation hardware to generate a translation of the I/O-side memory address to a memory-side memory address, and an input/output translation lookaside buffer (IOTLB) in which to store the translation; and an IOTLB prefetch control unit including prefetch control logic to, in response to determining that the memory-side address is inaccessible, emulate completion of the zero-length transaction. The prefetch control logic may also be to determine, based on a prefetch enable indicator, whether to generate a fault instead of emulate completion of the zero-length transaction. The system may also include a first counter to keep track of pending translation requests from the IOTLB prefetch control unit to the IOMMU. The system may also include a second counter to keep track of pending translation requests from the IOTLB prefetch control unit to the IOMMU and a prefetch counter indicator to track which of the first counter and the second counter the IOTLB prefetch control unit is to increment in connection with a new translation request.

What is claimed is:

1. An apparatus comprising:
a bridge between an input/output (I/O) side of a system and a memory side of the system, the I/O side to include an interconnect on which a zero-length transaction is to be initiated by an I/O device, the zero-length transaction to include an I/O-side memory address;
an input/output memory management unit (IOMMU) including
address translation hardware to generate a translation of the I/O-side memory address to a memory-side memory address, and
an input/output translation lookaside buffer (IOTLB) in which to store the translation; and
an IOTLB prefetch control unit including prefetch control logic to cause the apparatus to, in response to determining that the memory-side address is inaccessible, emulate completion of the zero-length transaction and to, in response to determining that I/O device prefetching to the IOTLB is not enabled and that the I/O device is not permitted to access a system memory, generate a fault instead of emulating completion of the zero-length transaction.

2. The apparatus of claim 1, wherein the prefetch control logic includes a state machine.

3. The apparatus of claim 1, wherein the prefetch control logic is also to determine, based on a prefetch enable indicator, whether to generate a fault instead of cause the apparatus to emulate completion of the zero-length transaction.

4. The apparatus of claim 1, further comprising a first counter to keep track of pending translation requests from the IOTLB prefetch control unit to the IOMMU.

5. The apparatus of claim 4, further comprising a second counter to keep track of pending translation requests from the IOTLB prefetch control unit to the IOMMU and a prefetch counter indicator to track which of the first counter and the second counter the IOTLB prefetch control unit is to increment in connection with a new translation request.

6. A method comprising:
initiating, by an input/output (I/O) device on an I/O side of a system, a zero-length transaction;
receiving, by a root complex on the I/O fabric, the zero-length transaction;
determining, by the root complex based on a request type and a target location, whether the I/O device is permitted to access a system memory, the request type and the target location indicated by the zero-length transaction;
emulating, by the root complex in response to determining that the I/O device is not permitted to access the system memory, completion of the zero-length transaction instead of generating a fault; and
determining, by the root complex, whether I/O device prefetching to an input/output translation lookaside buffer (IOTLB) is enabled;
generating, by the root complex in response to determining that I/O device prefetching to the IOTLB is not enabled and that the I/O device is not permitted to access the system memory, a fault instead of emulating completion of the zero-length transaction.

7. The method of claim 6, further comprising, by the root complex in response to determining that the I/O device is permitted to access the system memory, initiating a memory-side transaction corresponding to the zero-length transaction.

8. The method of claim 7, further comprising, by an I/O translation lookaside buffer (IOTLB) prefetch unit, requesting a translation of an I/O-side memory address to a memory-side memory address.

9. The method of claim 8, further comprising, by the IOTLB prefetch unit in connection with requesting the translation, incrementing a first counter.

10. The method of claim 9, further comprising, by an I/O memory management unit (IOMMU), translating the I/O-side memory address to the memory-side address to generate a completed translation.

11. The method of claim 10, further comprising, by the IOMMU, storing the completed translation in the IOTLB.

12. The method of claim 11, further comprising, by the IOMMU to the IOTLB prefetch unit, indicating that the translation is complete.

13. The method of claim 12, further comprising, by the IOTLB prefetch unit in response to an indication that the translation is complete, decrementing the first counter.

14. The method of claim 13, further comprising, by the IOMMU, requesting the IOTLB prefetch unit to drain transactions.

15. The method of claim 14, further comprising, by the IOTLB prefetch unit in response to receiving a request from the IOMMU to drain transactions, switching to incrementing a second counter instead of the first counter in connection with requesting a new translation.

16. A system comprising:
a memory side including a system memory;
an input/output (I/O) side including an I/O device and an interconnect on which a zero-length transaction is to be initiated by the I/O device, the zero-length transaction to include an I/O-side memory address;
an input/output memory management unit (IOMMU) including
address translation hardware to generate a translation of the I/O-side memory address to a memory-side memory address, and
an input/output translation lookaside buffer (IOTLB) in which to store the translation; and
an IOTLB prefetch control unit including prefetch control logic to, in response to determining that the memory-side address is inaccessible, emulate completion of the zero-length transaction and to, in response to determining that I/O device prefetching to the IOTLB is not enabled and that the I/O device is not permitted to access the system memory, generate a fault instead of emulating completion of the zero-length transaction.

17. The system of claim 16, wherein the prefetch control logic is also to determine, based on a prefetch enable indicator, whether to generate a fault instead of emulate completion of the zero-length transaction.

18. The system of claim 16, further comprising a first counter to keep track of pending translation requests from the IOTLB prefetch control unit to the IOMMU.

19. The system of claim 18, further comprising a second counter to keep track of pending translation requests from the IOTLB prefetch control unit to the IOMMU and a prefetch counter indicator to track which of the first counter and the second counter the IOTLB prefetch control unit is to increment in connection with a new translation request.

\* \* \* \* \*